JOSEPH T. BERNSTEIN
INVENTOR.

BY Max Geldin
ATTORNEY

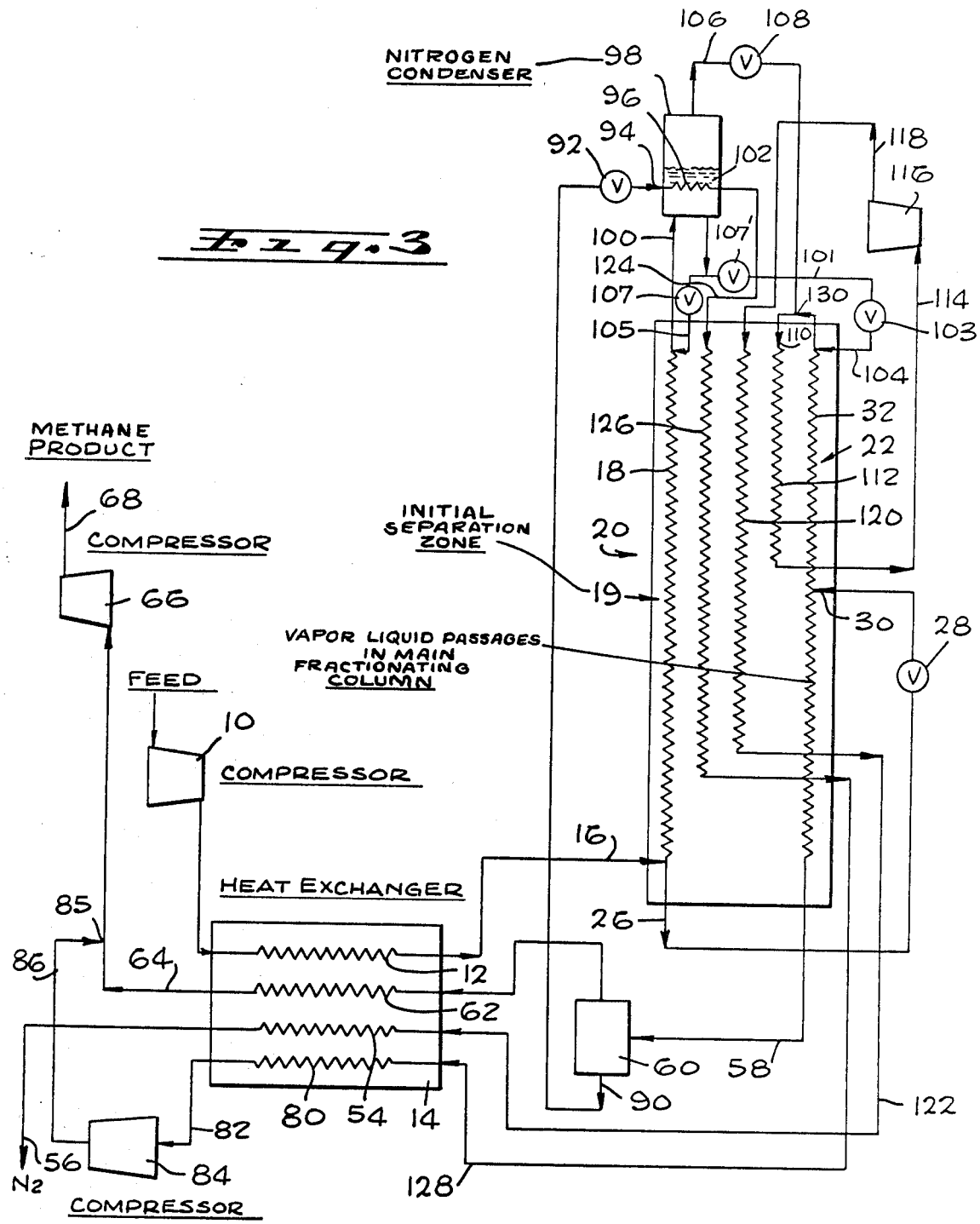

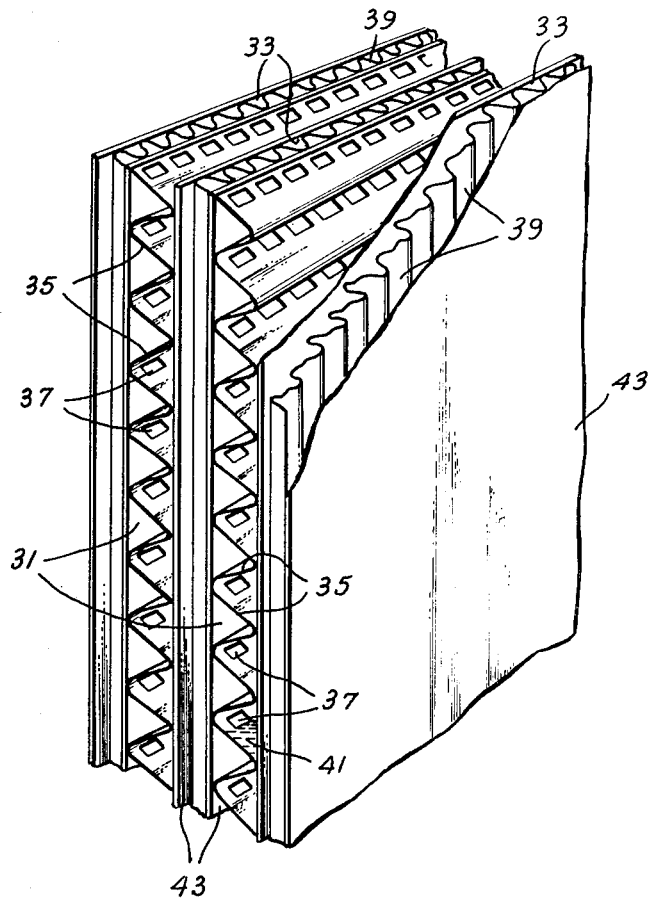

United States Patent Office 3,516,262
Patented June 23, 1970

3,516,262
SEPARATION OF GAS MIXTURES SUCH AS METHANE AND NITROGEN MIXTURES
Joseph T. Bernstein, Westport, Conn., assignor, by mesne assignments, to McDonnell Douglas Corporation, Santa Monica, Calif., a corporation of Maryland
Filed May 1, 1967, Ser. No. 634,917
Int. Cl. F25j 3/02, 3/08
U.S. Cl. 62—28                    21 Claims

ABSTRACT OF THE DISCLOSURE

This invention is directed to an efficient system particularly designed for separating methane from mixtures of nitrogen and methane, which involves, according to one embodiment, separating a mixture of methane and nitrogen in an initial separation stage to produce cold nitrogen vapor and a methane-rich liquid, feeding the methane-rich liquid to a fractionating column in heat exchange relation with the initial separation stage, recycling the cold nitrogen at reduced temperature, preferably in several passes in series, in heat exchange relation along the upper portion of the fractionating column and the initial separation zone, the vapor-liquid mixture in the lower portion of the initial separation zone providing heat and reboiling duty along the lower portion of the main column, and withdrawing methane in substantially pure form from the bottom of the main fractionating column, the associated initial separation zone and main column being operated under conditions to effect a "differential" distillation in the column.

---

This invention relates to the separation of the components of gas mixtures, particularly mixtures of nitrogen and methane, by rectification, and is particularly concerned with procedure for the separation of methane in substantially pure form from mixtures thereof with nitrogen in multiple separation zones which are suitably associated in heat exchange relation, employing in the separation zones the principles of "differential" distillation, and with a system for carrying out such procedure.

In the operation of a fractionating column, e.g., for the separation of oxygen and nitrogen from air, it has been found that the liquid and vapor in the column are near or at equilibrium only at certain points in the column. It has been found according to the invention described in the co-pending application, Ser. No. 539,840, of James D. Yearout, filed Apr. 4, 1966, that substantially greater efficiency is achieved and equilibrium between liquid and vapor is obtained substantially incrementally throughout the height of the column, by adding heat along the lower portion of the column, and by removing heat along the upper portion of the column. Such continuous incremental addition of heat to the lower portion of the column and continuous incremental removal of heat from the upper portion of the column results in "differential" distillation, rather than "fractional" distillation. In this manner, equilibrium is much more closely approached throughout the column.

For this purpose a so-called heat pumping fluid is passed in heat exchange relation along the column, employing as heat pumping fluid any fluid having a substantially constant composition as it passes in heat exchange relation with the contents of the column, and effects a continuous heat transfer along said column between the fluid and the vapor-liquid mixture in the column, and a non-adiabatic differential distillation in the column, the system being operated under conditions so as to produce such differential distillation throughout the column. Thus, for example, helium or nitrogen can be employed as such heat pumping fluid.

The processing or separation of the components of natural gas containing low boiling hydrocarbons and nitrogen, such as for example mixtures of a major proportion of methane and a minor proportion of nitrogen, to recover substantially pure hydrocarbon, such as methane, for use as a low cost fuel which can be readily transported by pipeline and stored, has assumed considerable importance. By the term hydrocarbons or methane "in substantially pure form" as employed herein, is intended to denote such hydrocarbons or methane of at least 95% purity, and preferably of the order of 97 percent or greater.

According to the present invention, there is provided a process and system for the separation of the components of a mixture of gases containing at least two components having different boiling points, such as a mixture of methane and nitrogen, which comprises cooling a compressed mixture of said gases approximately to its saturation temperature, introducing the cooled saturated gas mixture into an initial separation zone in heat exchange relation with a main fractionating column, passing the gas mixture through and along the initial separation zone and in heat exchange relation along the main fractionating column, and effecting a separation in said zone, withdrawing a first lower boiling component, e.g., nitrogen, of said gas mixture as overhead from said initial separation zone, withdrawing a liquid mixture of said first component and a second higher boiling component of said gas mixture, said liquid mixture being rich in said second component, e.g., a methane-rich mixture of methane and nitrogen, introducing such last mentioned mixture as feed into said main fractionating column intermediate the ends thereof, recycling the overhead first component, e.g., nitrogen, at reduced temperature in heat exchange relation along the upper portion of the fractionating column to provide refrigerant and condensing duty along the upper portion of the column and the upper portion of the initial separation zone, the vapor-liquid mixture in the lower portion of the initial separation zone providing heat and reboiling duty along the lower portion of the main column, withdrawing the recycled first component, e.g., nitrogen, and withdrawing said second component, e.g., methane, in substantially pure form from the bottom of the fractionating column.

In preferred practice, the above-noted first lower boiling component of the gas mixture, e.g., nitrogen, is recycled in a plurality of passes in series in indirect heat exchange relation along the upper portion of the fractionating column to provide refrigeration therein and in the initial separation zone, such lower boiling component, e.g., nitrogen, preferably being expanded to reduce the temperature thereof prior to one or more of said passes in such recycling operation.

The recycling of the above-noted lower boiling component such as nitrogen in indirect heat exchange relation along the upper portion of the main fractionating column, and the carrying out of the initial separation operation and the separation in the main fractionating column utilizing proper heat exchange relation between the initial separation zone and the main fractionating column, employing suitable apparatus for this purpose, results in effecting a differential distillation of the vapor-liquid mixture in the main fractionating column, thereby increasing the efficiency thereof.

The process and system of the invention have the advantages of requiring relatively few operational steps and a minimum of components, thereby substantially reducing maintenance and initial equipment costs. Of particular significance, the employment of the lower boiling component of the gas mixture being separated, such as nitrogen, for a substantial or a major portion of the refrigeration duty, in conjunction with the use of the feed mixture in the lower portion of the initial separation zone for the reboiling duty, results in facilitating the matching of the reboiling and condensing requirements in the main fractionating column. Due to this latter advantage, in conjunction with the utilization of differential distillation, and the requirement of only a moderate compression of the feed gas mixture entering the initial separation zone, a substantial reduction in the power requirement for the separation of a given quantity of a substantially pure product such as methane, is afforded as compared to prior art processes for carrying out the same separation. Thus, a power requirement of only about 50 percent that of conventional prior art processes can be attained by carrying out the process of the present invention for obtaining methane in 97 percent purity from an initial mixture of 70 percent methane and 30 percent nitrogen, when compressing the initial feed mixture to 200 p.s.i.a., and substantially without any offsetting equipment cost increase.

According to preferred practice of the invention, the liquid mixture from the initial separation zone which is rich in higher boiling component, e.g., the methane-rich liquid mixture of methane and nitrogen, is throttled prior to introduction as feed into the main fractionating column. The resulting evaporating methane thus introduced into the main fractionating column affords additional condensing duty therein. Further, if desired, a minor portion of the higher boiling component, e.g., methane, withdrawn from the main fractionating column can be throttled to relatively low pressure and recirculated in indirect heat exchange relation along the upper portion of the main fractionating column to provide additional condensing duty. This latter operation is optional and can be omitted, e.g., by increasing the pressure of the feed gas mixture. Preferably, cooling of the initial compressed gas mixture to its saturation point is effected by passing the feed in counter current heat exchange relation with cold product and waste gas streams.

According to a further modification, in order to insure adequate reflux to the system, a portion of the liquid higher boiling component, e.g., methane, withdrawn from the main fractionating column, can be throttled to relatively low pressure and passed through a condenser containing high pressure lower boiling component, e.g., nitrogen, withdrawn from the initial separation zone, to produce condensation of such nitrogen, and such liquefied lower boiling component can then be introduced as reflux into either or both the main fractionating column and the initial separation zone. A portion of the higher boiling component, e.g., methane, exiting the condenser can then be circulated in indirect heat exchange relation with the upper portion of the main fractionating column and initial separation zone, to provide additional refrigeration therein.

The invention will be understood more clearly by the description below of certain embodiments of the invention taken in connection with the accompanying drawing wherein:

FIG. 3 is a schematic representation of another modified form of the system of FIG. 1; and FIG. 4 illustrates a heat exchanger arrangement which can be employed in the separation system of the invention.

Figure 1:
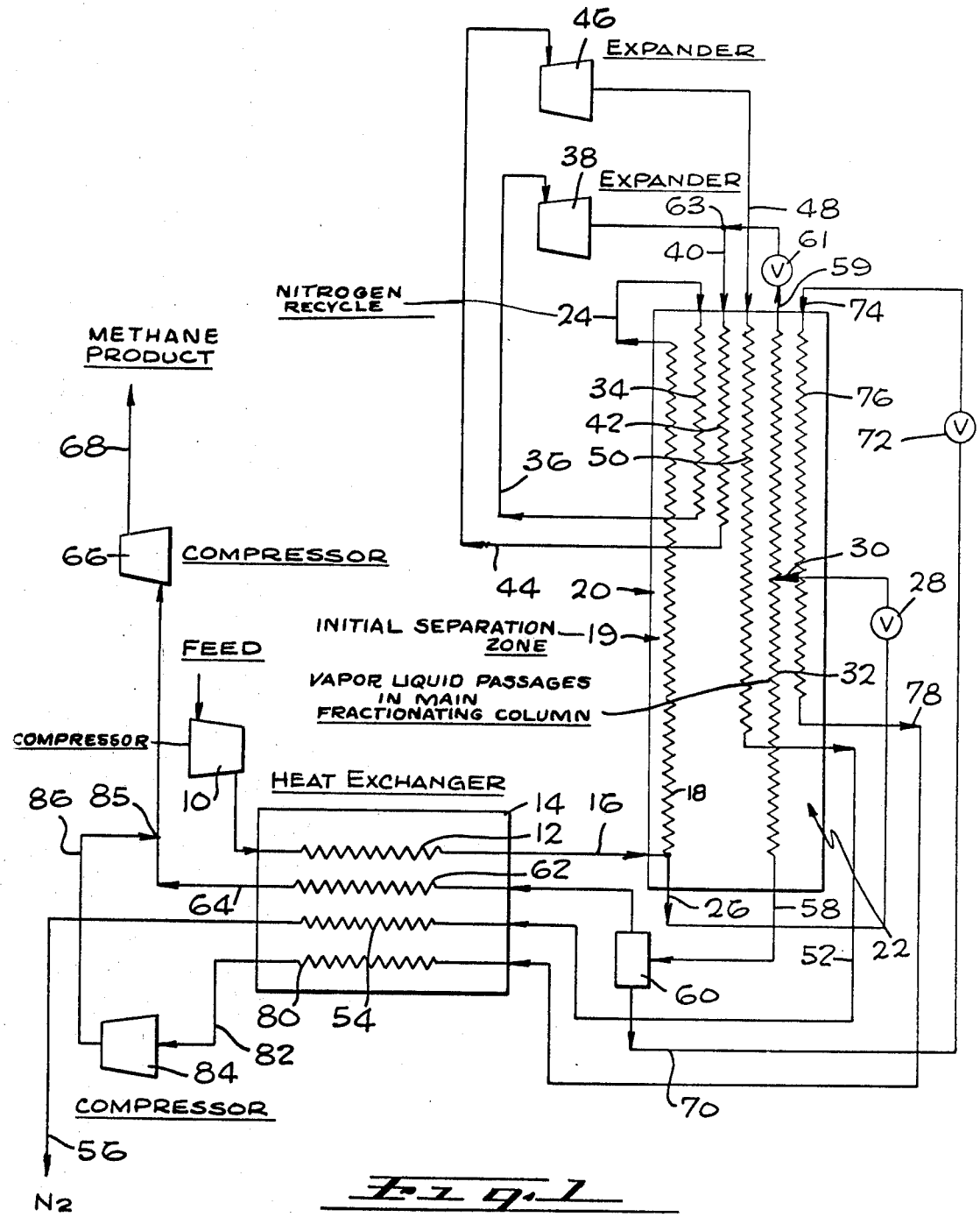
FIG. 1 is a schematic representation of a preferred form of separation system for separating substantially pure methane from a mixture of methane and nitrogen.

Referring to FIG. 1 of the drawing, a natural gas feed mixture containing 70 percent methane and 30 percent nitrogen is compressed at 10 to a pressure of 200 p.s.i. (absolute) and the compressed feed gas mixture at a temperature of 80° F. is then cooled to −194° F., its approximate saturation temperature, by passage of such compressed feed gas through coil 12 of a main heat exchanger 14 in countercurrent heat exchange relation with cold product and waste gas streams, as will be described more fully hereinafter.

The resulting compressed feed mixture at −194° F. is introduced at 16 into the lower end of one or more passages 18 of an initial separation zone 19 incorporated in a unit 20 including a main fractionating column portion 22. In the embodiment shown in FIG. 1, it will be seen that the initial separation zone 19, and passages 18 thereof extend substantially along the entire length of the unit 20 in heat exchange relation with the main fractionating column portion 22. In the passages 18 of the initial separation zone a separation of the feed mixture occurs and essentially pure nitrogen vapor at a pressure of about 200 p.s.i. and a temperature of −262° F. is withdrawn at 24 from the passages at the top of such zone and a methane-rich liquid mixture of methane and nitrogen containing about 93% methane, is withdrawn at 26 from the passages 18 at the bottom of the initial separation zone, at a pressure of about 200 p.s.i. and a temperature of about −194° F.; such liquid mixture is flashed by the throttling valve 28 to a pressure of 100 p.s.i. and a reduced temperature of −220° F., and the resulting flashed fluid is introduced at 30 into one or more vapor-liquid passages 32 in the main fractionating column portion 22. It will be noted that such passages 32 extend substantially the entire length of the unit 20 in heat exchange relation with the initial separation zone passages 18.

The nitrogen exiting the upper ends of the passages 18 of the initial separation zone is first recycled through one or more passages 34 in the upper portion of the unit 20 in indirect heat exchange relation with fractionating column portion 22 and the initial separation zone 19, and the exiting nitrogen which has been heated to a temperature of −220° F. is then fed via line 36 to a first expander or turbine 38, and the expanded nitrogen vapor now reduced in temperature to −270° F. and in pressure to 75 p.s.i. is introduced at 40 into one or more passages 42 in the upper portion of the unit 20 in indirect heat exchange relation with fractionating column 22 and with the initial separation zone 19.

The exiting nitrogen at 44 now heated to a temperature of −220° F. is introduced into a second expander or turbine 46, and the expanded nitrogen now cooled to a temperature of −284° F. and reduced to a pressure of 20 p.s.i., is introduced at 48 into one or more passages 50 in the upper portion of the unit 20 in indirect heat exchange relation with the fractionating portion 22 and the initial separation zone 19. The exiting nitrogen at 52 is then passed through coil 54 of the main heat exchanger 14 for cooling incoming compressed feed gas mixture at 12, and the exiting waste nitrogen containing about 0.5% methane, is discharged at 56.

In the vapor-liquid passages 32 of the main fractionating column 22, methane in substantially pure form, but containing a minor amount of nitrogen, is withdrawn as product from the bottom of the column at 58, at a temperature of −208° F. The methane withdrawn at 58 generally is in the form of a mixture of liquid and vapor, but can be either in substantially completely liquid form or in substantially completely vapor form. Such methane product is introduced into a vapor-liquid separator 60, and a major portion of such methane is passed through coil 62 of the main heat exchanger 14 in heat exchange relation with incoming compressed feed gas mixture at 12 for cooling same, and the exiting methane vapor at 64, having a pressure of 95 p.s.i. and a temperature of 60° F. can be compressed at 66 to a desired pressure, e.g., 800 p.s.i., for passage of the methane product through a pipeline as indicated at 68.

Essentially pure nitrogen vapor is withdrawn as overhead at 59 from the fractionating passages 32, is throttled at 61 to a pressure of 75 p.s.i. and is mixed at 63 with expanded nitrogen vapor exiting the first expander 38 and introduced into the heat exchange passages 42 of the unit 20.

A minor portion of methane produced at 58, e.g., about 30%, is withdrawn at 70 from the separator 60, and is throttled at 72 to a reduced temperature of −270° F., with the pressure reduced to 9 p.s.i. Such throttled methane fluid is introduced at 74 into one or more heat exchange passages indicated at 76 in the unit 20 in indirect heat exchange relation with the main fractionating column 22, and the initial separation zone 19. The exiting methane vapor at 78, now heated to a temperature of −210° F., is conducted through coil 80 of the main heat exchanger 14 to aid in cooling compressed gas feed mixture at 12, and the exiting methane vapor 82 at a pressure of 7 p.s.i. and a temperature of 60° F., is compressed at 84 to a pressure of 95 p.s.i. and is passed at 86 into admixture at 85 with the main methane product stream leaving the main heat exchanger at 64.

It will be seen from the above, that the nitrogen withdrawn from the initial separation zone 19 and recycled in series through the passages 34, 42 and 50 in the upper portion of the unit 20, employing two expanders 38 and 46 for reducing the temperature of the nitrogen during such recycling, provides substantial refrigeration or condensing duty for both the fractionating column 22 and the initial separation zone 19, the remainder of such condensing duty being provided by the evaporating methane-rich stream passing through the main fractionating passages 32 and the evaporating methane at reduced pressure passing through passages 76.

Reboiling duty is provided in the lower portion of the passages 32 of the main fractionating column 22 by the heat provided in the lower portion of the passages 18 of the initial separation zone 19, which are in heat exchange relation with such passages 32.

Hence, it is seen that the process and system described above and shown in FIG. 1 provide a relatively simple system employing a minimum of components, with the condensing and reboiling duty of the associated initial separation zone 19 and the main fractionating column 22 closely matched. The power requirement for such a system is substantially reduced, thereby substantially increasing the efficiency of such system over prior art processes and systems.

Figure 2:
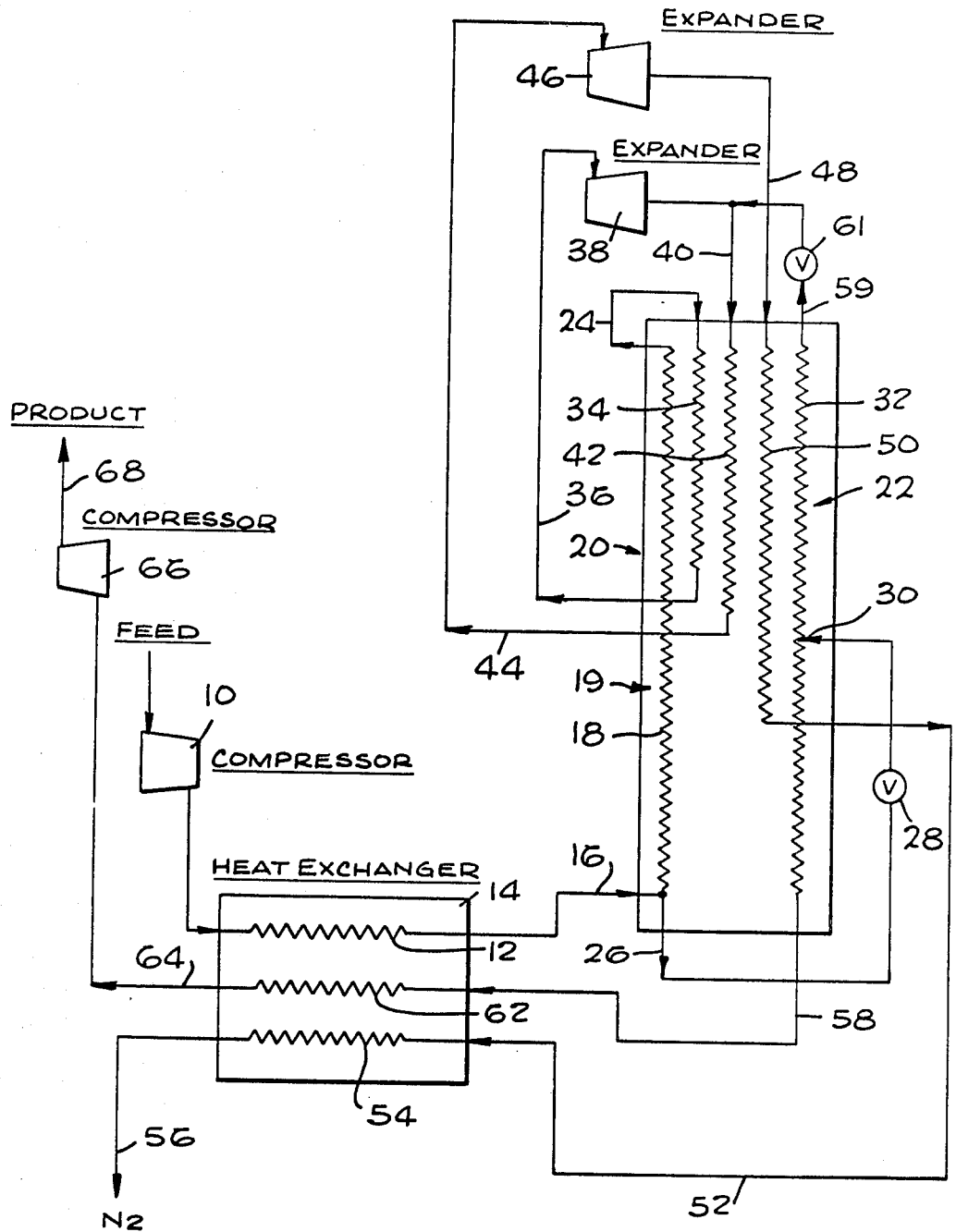
FIG. 2 is a schematic representation of a modification of the system of FIG. 1.

FIG. 2 illustrates a modification of the process of FIG. 1, which eliminates the recycling of low pressure methane at 74 to the top of the unit 20 as described above and illustrated in FIG. 1. Thus, in the system of FIG. 2, the elements 70, 72, 74, 76, 78, 80, 82, 84, and 86 are eliminated, and all of the methane product withdrawn at 58 is removed through coil 62 of the heat exchanger 14, compressed at 66 and obtained as compressed methane product at 68, as described above. The elimination of the recycling of a portion of the methane product and its evaporation at low pressure in the passages 76 is preferably compensated for by the use of a higher feed mixture pressure at 10.

In FIG. 3 there is illustrated a further modification of the invention system which insures an adequate reflux of liquid nitrogen to the system. According to this modification, a portion of the methane product is withdrawn at 90 from the vapor-liquid separator 60, and is first throttled at 92 for reduction in temperature and pressure, and the exiting methane fluid at 94 is passed through coil 96 of a nitrogen condenser 98, in heat exchange relation with high pressure nitrogen passed at 100 from passages 18 of the initial separation zone 19, into the condenser 98, and causing condensation of the nitrogen therein, as indicated at 102. Liquid nitrogen from the condenser 98 is then conducted at 101 through a throttling valve 103 to reduce the pressure of the nitrogen to the pressure in the main fractionating column portion 22, and such throttled nitrogen fluid is then introduced as reflux at 104 into the upper ends of the vapor-liquid passages 32 in the main fractionating column portion 22.

Liquid nitrogen from condenser 98 is also conducted at 105 into the upper ends of the passages 18 in the initial separation zone 19. Alternatively, depending upon operating conditions, if desired, liquid nitrogen from condenser 98 can be employed as reflux only in fractionating column portion 22 or only in the initial separation zone 19 by closing the appropriate shut-off valve 107 or 107' in lines 105 and 101, respectively.

Nitrogen overhead vapor at 106 from the condenser 98 is then throttled through valve 108 and is introduced at 110 into one or more passages 112 in indirect heat exchange relation with the upper portions of the main fractionating column portion 22 and the initial separation zone 19, and the exiting nitrogen at 114 is then introduced into an expander 116. The expanded nitrogen at 118 reduced in temperature and pressure is then introduced into a second passage or passages 120 in indirect heat exchange relation with the main fractionating column portion 22 and initial separation zone 19, and the exiting nitrogen at 122 is then passed through coil 54 of the main heat exchanger 14.

Methane fluid or vapor exiting coil 96 of the condenser 98 is passed at 124 into one or more passages 126 in indirect heat exchange relation with the upper portion of the main fractionating column portion 22 and the initial separation zone 19, to provide additional refrigeration, and the exiting methane vapor at 128 is conducted through coil 80 of the main heat exchanger 14. Overhead nitrogen from passages 32 of the main fractionating column portion 22, is mixed at 130 with nitrogen at 110 introduced into the passages 112 of the unit 20.

The heat exchange passages or constructions 34, 42 and 50 in FIGS. 1 and 2, and 112 and 120 in FIG. 3, for the recycled nitrogen, and the heat exchange passages or construction 76 of FIG. 1 and 126 of FIG. 3, for recycled methane, and the associated passages 18 of the initial separation zone 19 and the passages 32 of the main fractionating zone 22, all contained within the respective units 20 of FIGS. 1 to 3, can be in the form of a unitary plate-fin heat exchanger (not shown), wherein the passages or channels 34, 42, 50, or 112, 120 for the nitrogen refrigerant, and the passages or channels 76 or 126 for the methane refrigerant, are arranged in indirect heat exchange relation with the passages or channels 18 and with the passages or channels 32, bearing the liquid-vapor mixtures being separated in initial separation zone 19, and in the main fractionating column 22. The channels 18 and 32 can be constructed in the manner of a series of perfornated fins, producing the effect of distillation column trays. This is a known type of heat exchanger arrangement described in International Advances in Cryogenics, volume 10, 1965. A heat exchanger arrangement or construction of this type is also disclosed in the copending application Ser. No. 572,135, filed Aug. 12, 1966, of James D. Yearout, and which is incorporated herein by reference. A heat exchanger of this type is illustrated in FIG. 4. In FIG. 4 respective channels 31 containing the horizontally corrugated plates 35 and slots 37, bear the liquid-vapor mixture corresponding to respective channels 18 and 32 of the initial separation zone 19 and the main fractionating column 22, respectively of FIGS. 1 to 3, and some of the intermediate alternate channels 33 of the heat exchanger of FIG. 4, containing the vertically corrugated plates 39 provide passages corresponding to passages 42 and 50 in FIGS. 1 and 2, and 112 and 120 in FIG. 3 for the recycled nitrogen, and other channels 33 in FIG. 4 provide passages corresponding to passages 76 of FIG. 1 and 126 of FIG. 3, for recycled methane. Vertical plates 43 in the construction of FIG. 4 separate channels 31 and 33. Liquid reflux passes downwardly through channels 31, collecting in the troughs formed by the corrugations 35, as indicated at 41 until it overflows through the slots 37. The vapor in channels 31 passes upwardly through channels 31 via the slots 37, and impinges on the liquid film flowing from the slots 37 above. The recycled nitrogen and recycled methane pass through the respective intermediate channels 33 in indirect heat exchange relation with vapor-liquid mixture being separated in the respective channels 31. However, the above noted and described heat exchanger arrangements or constructions per se form no part of the present invention. Although such a plate-fin type of heat exchanger arrangement is preferably employed, any other suitable form of heat exchanger apparatus can be employed in providing the unit 20 containing the initial separation zone 19 and the main fractionating column portion 22 in indirect heat exchange relation with each other and with the passages for the refrigerating fluids, as described above and shown in FIGS. 1, 2 and 3, so as to effect the above-described differential distillation in the fractionating column 32 and in the initial separation zone 19.

Although the invention process and system as described above are designed particularly for separation of a gas mixture containing a low boiling hydrocarbon such as methane or ethane, and nitrogen, the principles of the invention and the systems illustrated in the drawings can be similarly applied to the separation of components of other mixtures of gases containing at least two components having different boiling points. Thus, according to the invention principles as described above, mixtures of nitrogen and oxygen, and air, also can be separated by the invention process and system.

It will be understood that the systems described above, including the temperatures and pressures set forth, are only illustrative and are not intended as limitative of the invention.

While I have described particular embodiments of my invention for the purpose of illustration, it should be understood that various additional modifications and adaptations thereof may be made within the spirit of the invention, and within the scope of the appended claims.

I claim:

1. A process for the separation of the components of a mixture of gases containing at least two components having different boiling points, wherein the improvement comprises the steps of cooling a compressed mixture of said gases approximately to its saturation temperature, introducing said cooled saturated gas mixture into an initial separation zone in side-by-side indirect heat exchange relation with a main fractionating column, passing said gas mixture through and along the length of said initial separation zone and in indirect heat exchange relation with said main fractionating column along the length thereof, and affecting a separation in said zone, withdrawing a first lower boiling component of said gas mixture as overhead from said initial separation zone, withdrawing a liquid mixture of said first component and a second higher boiling component of said gas mixture, said liquid mixture being rich in said second component, introducing said last mentioned mixture as feed into said main fractionatng column intermediate the ends thereof, recycling said overhead first component at reduced temperature in indirect heat exchange relation with and along the upper portion of said fractionating column and the upper portion of said initial separation zone, to provide refrigerant and condensing duty along the upper portion of said column and the upper portion of said initial separation zone, the vapor-liquid mixture passing through the lower portion of said initial separation zone in indirect heat exchange relation with said main column providing heat and reboiling duty along the lower portion of said main column and effecting a non-adiabatic differential distillation in and substantially along the entire length of said main fractionating column, withdrawing said recycled first component, and withdrawing said second component in substantially pure form, from the bottom of said fractionating column.

2. A process as defined in claim 1, wherein said mixture of gases is a mixture of nitrogen and methane, said first component of said mixture being nitrogen and said second component methane.

3. A process as defined in claim 1, wherein said overhead first component from said initial separation zone is expanded and cooled during said recycling in heat exchange relation along the upper portion of said main fractionating column.

4. A process as defined in claim 1, wherein said overhead first component from said initial separation zone is recycled in several passes in series in indirect heat exchange relation along the upper portion of said main fractionating column, said first component being expanded and cooled at least once prior to the respective recycling passes.

5. A process as defined in claim 4 wherein said mixture of gases is a mixture of nitrogen and methane, said first component of said mixture being nitrogen and said second component methane.

6. A process as defined in claim 1, including separating a portion of the second component withdrawn from the bottom of said fractionating column, cooling said last mentioned portion of second component, and passing said cooled second component in indirect heat exchange relation along the upper portion of said main fractionating column, and providing additional refrigerant in the upper portion of said fractionating column and in the upper portion of said initial separation zone.

7. A process as defined in claim 1, wherein said mixture of gases is a mixture of nitrogen and methane, said first component of said mixture being nitrogen and said second component methane, methane in substantially pure form being withdrawn from the bottom of said fractionating column, and including separating a portion of said withdrawn methane, throttling and cooling said separated portion of methane, and passing said throttled and cooled methane in indirect heat exchange relation along the upper portion of said main fractionating column, to provide additional refrigerant in the upper portion of said fractionating column and in the upper portion of said initial separation zone.

8. A process as defined in claim 1, including passing said recycled first component withdrawn from heat exchange relation with said fractionating column, and said second component withdrawn from the bottom of said fractionating column, into heat exchange relation with said compressed gas mixture for cooling same prior to introduction thereof into said initial separation zone.

9. A process as defined in claim 1, wherein said mixture of gases is a mixture of nitrogen and methane, said first component of said mixture being nitrogen and said second component methane, said nitrogen-methane gas mixture being first moderately compressed and cooled to its saturation temperature, substantially pure nitrogen being withdrawn as overhead from said initial separation zone, said nitrogen being initially recycled in indirect heat exchange relation along the upper portion of said main fractionating column, the exiting nitrogen expanded and cooled and again recycled in indirect heat exchange relation along the upper portion of said fractionating column, and the resulting exiting nitrogen expanded and cooled and again recycled in indirect heat exchange relation along the upper portion of said fractionating column.

10. A process as defined in claim 9, wherein said nitrogen-methane gas mixture consists of about 70 percent methane and 30 percent nitrogen, said nitrogen-methane feed mixture being initially compressed to about 200 p.s.i.

11. A process as defined in claim 9, wherein said nitrogen-methane liquid mixture withdrawn from said initial separation zone, and enriched in methane, is throttled and cooled and introduced into said fractionating column, and including passing the exiting nitrogen recycled in indirect heat exchange relation with said fractionating column, and passing said substantially pure methane withdrawn from the bottom of said fractionating column, into heat exchange relation with said compressed nitrogen-methane gas mixture for cooling same, and compressing the resulting heated methane to provide methane product.

12. A process as defined in claim 1, wherein said mixture of gases is a mixture of nitrogen and methane, said first component of said mixture being nitrogen and said second component methane, methane in substantially pure form being withdrawn from the bottom of said fractionating column, and including separating a portion of said methane, throttling and cooling said separated portion of methane, passing said throttled and cooled methane through a condenser in indirect heat exchange relation with nitrogen withdrawn as overhead from the initial separation zone, to condense said nitrogen, introducing condensed nitrogen as reflux into at least one of said main fractionating column and said initial separation zone, the nitrogen vapor from said condenser being recycled in said heat exchange relation along the upper portion of said fractionating column.

13. A system for the separation of the components of a mixture of gases, which comprises means forming an initial separation zone, a main fractionating column, said initial separation zone being in side-by-side indirect heat exchange relation with said column, a first passage means along the length of said initial separation zone for passing a gas mixture along the length of said initial separation zone in indirect heat exchange relation with said column, a second passage means in and along the length of said fractionating column for separating a vapor-liquid mixture therein, conduit means interconnecting the lower end of said first passage means with said second passage means intermediate the opposite ends of said fractionating column, throttling valve means in said conduit means for cooling a fluid in said conduit means, means for recycling fluid refrigerant from the upper end of said first passage means into indirect heat exchange relation with and along the upper portion of said fractionating column and with the upper portion of said initial separation zone, said first pasage means in said initial separation zone and said second passage means in said column being substantially coextensive and in indirect heat exchange relation with each other, and providing reboil in the lower portion of said main column by passage of said gas mixture through the lower portion of said first passage means, means for withdrawing recycled fluid from said recycling means, and means for withdrawing fluid product from said second passage means in said fractionating column.

14. A system as defined in claim 13, said recycling means including a plurality of recycling passageways in and along the upper portion of said fractionating column in indirect heat exchange relation with said second passage means in said column, conduit means connecting said last-mentioned passageways in series, and expansion means in said last-mentioned conduit means for cooling a fluid during recycling thereof through said passageways.

15. A system as defined in and along claim 14, including three such recycling passageways in the upper portion of said fractionating column, said first passage means in said initial separation zone being connected with the inlet of the first of said three passageways, a first expander in the conduit means between the discharge end of said first passageway and the inlet to said second passageway, and a second expander in the conduit means between the discharge end of said second passageway and the inlet to said third passageway.

16. A system as defined in claim 14, including means for separating a portion of fluid product withdawn from the bottom of said second passage means in said fractionating column, a third passage means along the upper portion of said fractionating column, conduit means connecting said separating means and said third passage means, means in said last-mentioned conduit means for cooling a fluid therein, and means for withdrawing fluid from said third passage means.

17. A system as defined in claim 16, including a main heat exchanger, conduit means passing through said heat exchanger and connected to the lower end of said first passage means, conduit means from said separating means and passing through said heat exchanger, conduit means connected to the discharge end of said passageways and passing through said heat exchanger, and conduit means connected to the discharge end of said third passage means and passing through said heat exchanger.

18. A system as defined in claim 14, including two such recycling passageways in and along the upper portion of said fractionating column, a condenser, conduit means connecting said initial separation zone and said condenser, a coil in said condenser for passing fluid in indirect heat exchange relation with the contents of said condenser, conduit means for passing fluid product from said second passage means in said fractionating column to said condenser coil, means for cooling a fluid in said last-mentioned conduit means, means for conducting overhead gas from said condenser to one of said recycling passageways, conduit means for passage of liquid from said condenser into at least one of said first passage means in said initial separation zone and said second passage means in said fractionating column, a conduit connecting the discharge end of one of said recycling passageways with the inlet of the other of said recycling passageways, an expander in said last-mentioned conduit, and another passageway in indirect heat exchange relation with and along the upper portion of said fractionating column, said last mentioned passageway being connected to the discharge end of said condenser coil.

19. A system as defined in claim 13, including a main heat exchanger, conduit means for passage of a compressed gas mixture through said heat exchanger and communicating with the lower end of said first passage means in said initial separation zone, conduit means connecting the discharge end of said recycling means and passing through said heat exchanger, and conduit means connecting the lower end of said second passage means and passing through said heat exchanger.

20. A process for the separation of the components of a mixture of nitrogen and methane, wherein the improvement comprises the steps of first moderately compressing said nitrogen-methane gas mixture and cooling said compressed mixture approximately to its saturation temperature, introducing said cooled saturated gas mixture into an initial separation zone in heat exchange relation with a main fractionating column, passing said gas mixture through and along said initial separation zone in heat exchange relation along said main fractionating column, and effecting a separation in said zone, withdrawing substantially pure nitrogen as overhead from said initial separation zone, withdrawing a liquid mixture of methane and nitrogen, said liquid mixture being rich in methane, introducing said last-mentioned mixture as feed into said main fractionating column intermediate the ends thereof, initially recycling said overhead nitrogen at reduced temperature in indirect heat exchange relation along the upper portion of said main fractionating column, expanding the exiting nitrogen and again recycling the expanded and cooled nitrogen in indirect heat exchange relation along the upper portion of said fractionating column, and expanding the resulting exiting nitrogen and again recycling said last-mentioned expanded and cooled nitrogen in indirect heat exchange relation along the upper portion of said fractionating column, to provide refrigerant and condensing duty along the upper portion of said column and the upper portion of said initial separation zone, the vapor-liquid mixture in the lower portion of said initial separation zone providing heat and reboiling duty along the lower portion of said main column, withdrawing said recycled nitrogen, withdrawing substantially pure methane from the bottom of said fractionating column, separating a portion of said last-mentioned methane, throttling and cooling said withdrawn portion of methane, passing said throttled and cooled methane in indirect heat exchange relation along the upper portion of said main fractionating column to vaporize said methane and provide refrigerant in the upper portion of said column and in the upper portion of said initial separation zone, and passing the exiting heated methane in heat exchange relation with the compressed nitrogen-methane feed mixture for cooling same.

21. A process for the separation of the components of a mixture of nitrogen and methane, wherein the improvement comprises the steps of cooling a compressed mixture of said gases approximately to its saturation temperature, introducing said cooled saturated gas mixture into an initial separation zone in heat exchange relation with a main fractionating column, passing said gas mixture through and along said initial separation zone and in heat exchange relation along said main fractionating column, and effecting a separation in said zone, withdrawing nitrogen as overhead from said initial separation zone, withdrawing a liquid mixture of methane and nitrogen, said liquid mixture being rich in methane, introducing said last-mentioned mixture as feed into said main fractionating column intermediate the ends thereof, recycling said overhead nitrogen at reduced temperature in heat exchange relation along the upper portion of said fractionating column to provide refrigerant and condensing duty along the upper portion of said column and the upper portion of said initial separation zone, the vapor-liquid mixture in the lower portion of said initial separation zone providing heat and reboiling duty along the lower portion of said main column, withdrawing methane in substantially pure form from the bottom of said fractionating column, separating a portion of said last-mentioned methane, throttling and cooling said separated portion of methane, passing said throttled and cooled methane through a condenser in heat exchange relation with nitrogen withdrawn as overhead from the initial separation zone, to condense said nitrogen, introducing condensed nitrogen as reflux into at least one of said main fractionating column and said initial separation zone, and withdrawing nitrogen vapor from said condenser, said recycling of nitrogen in heat exchange relation along the upper portion of said fractionating column including initially throttling said nitrogen withdrawn from said condenser, passing the exiting nitrogen in indirect heat exchange relation in one pass along the upper portion of said fractionating column, expanding the exiting nitrogen to reduce its temperature and pressure, and again passing the expanded nitrogen in indirect heat exchange relation along the upper portion of said fractionating column, to provide refrigerant in the upper portion of said column and in the upper portion of said initial separation zone, withdrawing said recycled nitrogen, and passing the methane exiting said condenser in indirect heat exchange relation along the upper portion of said fractionating column.

References Cited

UNITED STATES PATENTS

| | | | |
|---|---|---|---|
| 2,046,284 | 6/1936 | Boshkoff | 62—29 |
| 2,482,304 | 9/1949 | Van Nuys. | |
| 2,534,903 | 12/1950 | Etienne | 62—131 |
| 2,552,451 | 5/1951 | Patterson | 62—29 |
| 2,672,031 | 3/1954 | Schilling | 62—29 |
| 2,753,698 | 7/1956 | Jakob | 62—29 |
| 2,765,637 | 10/1956 | Etienne | 62—31 |
| 2,823,523 | 2/1958 | Eakin | 62—31 |
| 1,537,193 | 5/1925 | Roberts et al. | 62—29 |
| 1,604,240 | 10/1926 | Schlitt et al. | 62—29 |
| 1,604,248 | 10/1926 | Van Nuys | 62—29 |
| 2,760,351 | 8/1956 | Schilling | 62—29 |
| 2,861,432 | 11/1958 | Haserden | 62—29 |

NORMAN YUDKOFF, Primary Examiner

U.S. Cl. X.R.

62—13, 26, 29, 31, 39